United States Patent
Bowden et al.

(10) Patent No.: US 10,077,205 B2
(45) Date of Patent: Sep. 18, 2018

(54) ALUMINOSILICATE GLASSES

(71) Applicant: Corning Incorporated, Corning, NY (US)

(72) Inventors: Bradley Frederick Bowden, Corning, NY (US); Adam James Ellison, Corning, NY (US); Ellen Anne King, Savona, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 15/309,975

(22) PCT Filed: May 13, 2015

(86) PCT No.: PCT/US2015/030444
§ 371 (c)(1),
(2) Date: Nov. 9, 2016

(87) PCT Pub. No.: WO2015/175581
PCT Pub. Date: Nov. 19, 2015

(65) Prior Publication Data
US 2017/0260084 A1    Sep. 14, 2017

Related U.S. Application Data

(60) Provisional application No. 61/993,711, filed on May 15, 2014.

(51) Int. Cl.
*C03C 3/091* (2006.01)
*C03C 3/093* (2006.01)
*G02F 1/1333* (2006.01)

(52) U.S. Cl.
CPC ............ *C03C 3/093* (2013.01); *C03C 3/091* (2013.01); *G02F 1/1333* (2013.01); *G02F 2001/133302* (2013.01)

(58) Field of Classification Search
CPC ................................ C03C 3/091; C03C 3/093
See application file for complete search history.

(56) References Cited

U.S. PATENT DOCUMENTS

| | | | |
|---|---|---|---|
| 3,338,696 A | 8/1967 | Dockerty | |
| 3,682,609 A | 8/1972 | Dockerty | |
| 6,169,047 B1 | 1/2001 | Nishizawa et al. | |
| 6,417,124 B1 | 7/2002 | Peuchert et al. | |
| 7,524,784 B2 | 4/2009 | Chacon et al. | |
| 8,324,123 B2 | 12/2012 | Shimada et al. | |
| 8,426,327 B2 | 4/2013 | Yanase et al. | |
| 8,598,056 B2 | 12/2013 | Ellison et al. | |
| 9,586,854 B2 | 3/2017 | Kawaguchi et al. | |
| 2002/0013210 A1 | 1/2002 | Peuchert et al. | |
| 2009/0294773 A1 | 12/2009 | Ellison | |
| 2012/0282450 A1* | 11/2012 | Kawaguchi | C03C 3/093 428/220 |

FOREIGN PATENT DOCUMENTS

| | | |
|---|---|---|
| CN | 1878168 | 12/2006 |
| KR | 20060090175 A | 8/2006 |
| TW | 570905 B | 1/2004 |

* cited by examiner

*Primary Examiner* — Elizabeth A. Bolden
(74) *Attorney, Agent, or Firm* — Ryan T. Hardee

(57) ABSTRACT

Described herein are alkali-free, boroalumino silicate glasses exhibiting desirable physical and chemical properties for use as substrates in flat panel display devices, such as, active matrix liquid crystal displays (AMLCDs) and active matrix organic light emitting diode displays (AMOLEDs). In accordance with certain of its aspects, the glasses possess good dimensional stability as a function of temperature.

15 Claims, 2 Drawing Sheets

ALUMINOSILICATE GLASSES

CROSS-REFERENCE TO RELATED APPLICATIONS

This application claims the benefit of priority under 35 U.S.C. § 371 of International Patent Application Serial No. PCT/US15/30444, filed on May 13, 2015, which in turn, claims the benefit of priority of U.S. Provisional Patent Application Ser. No. 61/993,711 filed on May 15, 2014, the contents of each of which are relied upon and incorporated herein by reference in their entireties.

BACKGROUND

The production of liquid crystal displays, for example, active matrix liquid crystal display devices (AMLCDs) is very complex, and the properties of the substrate glass are extremely important. First and foremost, the glass substrates used in the production of AMLCD devices need to have their physical dimensions tightly controlled. The downdraw sheet drawing processes and, in particular, the fusion process described in U.S. Pat. Nos. 3,338,696 and 3,682,609, both to Dockerty, are capable of producing glass sheets that can be used as substrates without requiring costly post-forming finishing operations such as lapping and polishing. Unfortunately, the fusion process places rather severe restrictions on the glass properties, which require relatively high liquidus viscosities.

In the liquid crystal display field, there are various methods of producing the thin film transistors (TFTs) necessary for AMLCDs. Historically, panel makers have produced either large, low resolution displays utilizing amorphous-silicon (a-Si) based transistors, or small, high resolution displays utilizing poly-crystalline (p-Si) based and oxide thin film (Ox) based transistors. Although it was once thought that a-Si TFTs would be replaced by p-Si TFTs, consumer demand for low cost, large, high resolution displays, and the cost of manufacturing such large scale displays with p-Si TFTs, is driving AMLCD manufacturers to extend their use of a-Si TFTs to higher and higher resolution. These resolution increases necessitate stricter standards in dimensional stability for the glass substrate used in the TFT manufacturing process. During a-Si, oxide or low temperature p-Si TFT fabrication, the glass substrate is held at a process temperature ranging from 350° C. to 450° C., whilst the thin film transistor is created. At these temperatures most AMLCD glass substrates undergo a process called compaction. Compaction, also referred to as thermal stability or dimensional change, is an irreversible dimensional change (shrinkage) in the glass substrate due to changes in the glass' fictive temperature. "Fictive temperature" is a concept used to indicate the structural state of a glass. Glass that is cooled quickly from a high temperature is said to have a higher fictive temperature because of the "frozen in" higher temperature structure. Glass that is cooled more slowly, or that is annealed by holding for a time near its annealing point, is said to have a lower fictive temperature.

The magnitude of compaction depends both on the process by which a glass is made and the viscoelastic properties of the glass. In the float process for producing sheet products from glass, the glass sheet is cooled relatively slowly from the melt and, thus, "freezes in" a comparatively low temperature structure into the glass. The fusion process, by contrast, results in very rapid quenching of the glass sheet from the melt, and freezes in a comparatively high temperature structure. As a result, a glass produced by the float process may undergo less compaction when compared to glass produced by the fusion process, since the driving force for compaction is the difference between the fictive temperature and the process temperature experienced by the glass during compaction. Thus, it would be desirable to minimize the level of compaction in a glass substrate that is produced by a downdraw process.

There are two approaches to minimize compaction in glass. The first is to thermally pretreat the glass to create a fictive temperature similar to the one the glass will experience during TFT manufacture. There are several difficulties with this approach. First, the multiple heating steps employed during the TFT manufacturing process create slightly different fictive temperatures in the glass that cannot be fully compensated for by this pretreatment. Second, the thermal stability of the glass becomes closely linked to the details of the TFT manufacture, which could mean different pretreatments for different end-users. Finally, pretreatment adds to processing costs and complexity.

Another approach is to slow the rate of strain at the process temperature by increasing the viscosity of the glass. This can be accomplished by raising the viscosity of the glass. The annealing point represents the temperature corresponding to a fixed viscosity for a glass, and thus an increase in annealing point equates to an increase in viscosity at fixed temperature. The challenge with this approach, however, is the production of high annealing point glass that is cost effective. The main factors impacting cost are defects and asset lifetime. In a modern continuous unit (CU) melter comprising a refractory premelt, a precious metal finer and a precious metal glass delivery stem—coupled to a fusion draw machine, four types of defects are commonly encountered: (1) gaseous inclusions (bubbles or blisters); (2) solid inclusions from refractories or from failure to properly melt the batch; (3) metallic defects consisting largely of platinum; and (4) devitrification products resulting from low liquidus viscosity or excessive devitrification at either end of the isopipe. Glass composition has a disproportionate impact on the rate of melting, and hence on the tendency of a glass to form gaseous or solid defects and the oxidation state of the glass impacts the tendency to incorporate platinum defects. Devitrification of the glass on the forming mandrel, or isopipe, is best managed by selecting compositions with high liquidus viscosities.

Dimensional stability in the glass substrate during the TFT manufacturing process is also affected by elastic strain. There are two main causes of elastic strain experienced by the substrate. During the fusion process elastic strain, and therefore stress, can be introduced into the glass sheet upon cooling via small thermal gradients. These stresses undergo stress relaxation during the TFT manufacturing process resulting in dimensional instability. Such instability can be minimized, in the same way as compaction, via a decrease in the strain rate at the TFT process temperature by increasing the annealing point of the glass substrate. The second type of elastic strain is related to the stress imposed on the substrate when the transistor itself is deposited on glass surface. Such elastic strain is minimized by increasing the Young's modulus of the glass, such that the stress imposed on the substrate surface produces a minimal amount of strain and reduces dimensional changes seen in the glass sheet.

In addition to the problems with dimensional stability mentioned above, AMLCD manufacturers are finding that both demand for larger display sizes and the economics of scale are driving them to process larger sized pieces of glass in excess of 2 meters on each side. This raises several concerns. First is simply the weight of the glass. The increase in glass weight in going to larger sized pieces of glass implications for the robotic handlers used to move the glass into and through process stations. In addition, elastic sag, which is dependent upon glass density and Young's modulus, becomes a particularly critical issue with larger sheet sizes, impacting the ability to load, retrieve, and space the glass in the cassettes used to transport the glass between process stations. Accordingly, it is desirable to identify compositions that reduce issues associated with sag in addition to minimizing compaction, stress relaxation and elastic strain, while maintaining the defect-limiting attributes described above.

SUMMARY

Aspects of the invention pertain to compounds, compositions, articles, devices, and methods for the manufacture of alkali-free, boroalumino silicate glasses exhibiting desirable physical and chemical properties. In one or more embodiments, the glasses are suitable for use as substrates in flat panel display devices, such as, active matrix liquid crystal displays (AMLCDs) and active matrix organic light emitting diode displays (AMOLEDs). In accordance with one or more embodiments, glasses are provided that possess densities less than 2.55 g/cm$^3$ and good dimensional stability (i.e., low compaction). Additionally, one or more embodiments of the disclosed compositions have strain points in excess of 680° C. which, when subjected to the thermal history of the fusion process, have acceptable thermal stability for a-Si thin film transistor processes.

Also described herein are glasses that are substantially free of alkalis that possess high annealing points and high Young's modulus, thus, good dimensional stability (i.e., low compaction, elastic strain and stress relaxation) for use as TFT backplane substrates in amorphous silicon and oxide TFT processes. A high annealing point glass can prevent panel distortion due to compaction/shrinkage or stress relaxation during thermal processing subsequent to manufacturing of the glass. Embodiments of the inventive glasses also possess a high elastic modulus and relatively low density, thereby increasing the specific modulus of the glass and greatly reducing the risk of elastic sag in the glass sheet. Additionally, the inventive glasses possess unusually high liquidus viscosity, and thus a significantly reduced risk of devitrification at cold places in the forming apparatus. It is to be understood that while low alkali concentrations are generally desirable, in practice it may be difficult or impossible to economically manufacture glasses that are entirely free of alkalis. The alkalis in question arise as contaminants in raw materials, as minor components in refractories, etc., and can be very difficult to eliminate entirely. Therefore, the inventive glasses are considered substantially free of alkalis if the total concentration of the alkali elements $Li_2O$, $Na_2O$, and $K_2O$ is less than about 0.1 mole percent (mol %).

BRIEF DESCRIPTION OF THE DRAWINGS

The accompanying figures, which are incorporated in and constitute a part of this specification, illustrate several aspects described below.

DETAILED DESCRIPTION

Figure 1:
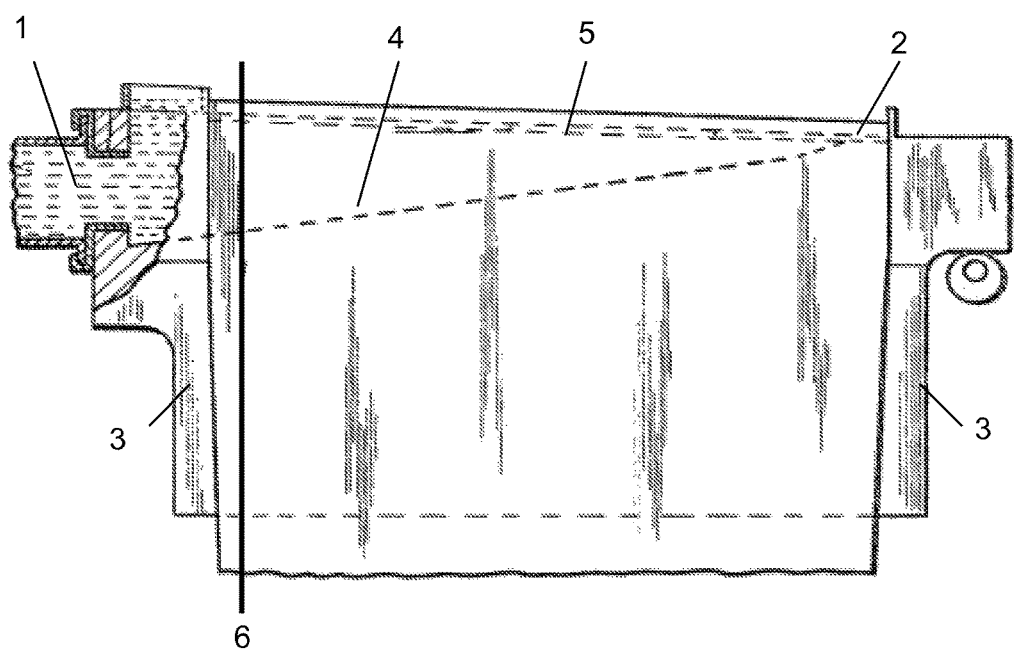
FIG. 1 is a schematic representation of a isopipe, the forming mandrel used to make precision sheet in the fusion draw process.

Described herein are glasses that are substantially free of alkalis that possess densities less than 2.55 g/cm$^3$ and good dimensional stability (i.e., low compaction, reduced stress relaxation and elastic strain). Additionally, one or more embodiments of the disclosed compositions have strain points in excess of 685° C. which, when subjected to the thermal history of the fusion process, have acceptable thermal stability for a-Si thin film transistor processes. Embodiments of the invention also provide glasses with high annealing points. A high annealing point glass can prevent panel distortion due to compaction/shrinkage and stress relaxation during thermal processing subsequent to manufacturing of the glass. It is to be understood that while low alkali concentrations are generally desirable, in practice it may be difficult or impossible to economically manufacture glasses that are entirely free of alkalis. The alkalis in question arise as contaminants in raw materials, as minor components in refractories, etc., and can be very difficult to eliminate entirely. Therefore, the disclosed glasses are considered substantially free of alkalis if the total concentration of the alkali elements $Li_2O$, $Na_2O$, and $K_2O$ is less than about 0.1 weight percent (mol %).

In one or more embodiments, the substantially alkali-free glasses have annealing points greater than about 730° C., specifically greater than 735° C., and more specifically greater than 740° C. According to one or more embodiments, the temperature of the disclosed glasses at a viscosity of about 10,000 poise ($T_{10k}$) is less than about 1300° C. The liquidus temperature of a glass ($T_{liq}$) is the highest temperature above which no crystalline phases can coexist in equilibrium with the glass. According to one or more embodiments, $T_{10k}-T_{liq}>30°$ C. The float process delivers glass at a viscosity between 3000 and 10,000 poise. If the glass devitrifies anywhere near the temperature corresponding to this viscosity, then devitrification products would show up in the finished product. In one or more embodiments, the glasses exhibit a specific modulus greater than 31. The specific modulus of the glass, defined as E/ρ, is indicative of the magnitude of elastic sag which a glass sheet will experience during processing. For this reason glass compositions with a specific modulus of 31 or greater are desirable. It will be understood that the disclosed glasses can exhibit one or more of the disclosed properties provided above. Thus, the disclosed glasses may exhibit one of the above disclosed properties, two of the above disclosed properties, three of the disclosed properties, four of the disclosed properties, five of the disclosed properties, six of the disclosed properties and/or seven of the disclosed properties, in any combination of the disclosed properties.

In one embodiment, the substantially alkali-free glass comprises in weight percent on an oxide basis in the following ranges:

$SiO_2$ 57-61
$Al_2O_3$ 17.5-20.5
$B_2O_3$ 5-8
MgO 1-5
CaO 3-9
SrO 0-6
BaO 0-6.5.

In specific embodiments, the glass comprises $SiO_2$, in weight percent on an oxide basis in the range 57.5-60.5. In another specific embodiment, the glass comprises $Al_2O_3$, in weight percent on an oxide basis in the range 17.8-20.2. In another specific embodiment, the glass comprises $B_2O_3$, in weight percent on an oxide basis 5.5-7.8. In another specific embodiment, the glass comprises MgO, in weight percent on an oxide basis 1-4.5. In another specific embodiment, the glass comprises CaO, in weight percent on an oxide basis 1-4.5. In another specific embodiment, the glass comprises CaO, in weight percent on an oxide basis 1-4.5. In another specific embodiment, the glass comprises SrO, in weight percent on an oxide basis 1-4.5. In another specific embodiment, the glass comprises BaO, in weight percent on an oxide basis 0-6.

In other specific embodiments, any of the above-described glasses can have one or more of the following properties: an annealing point greater than 730° C.; a specific modulus greater than 31; the glass satisfies the following: $T_{10k}-T_{liq}>30°$ C.

In another specific embodiment, a glass is provided comprising, in weight percent on an oxide basis: $SiO_2$ 57-61, $Al_2O_3$ 17-21, $B_2O_3$ 5-8, MgO greater than or equal to 3, CaO 2-4.5, SrO greater than or equal to 1.5, BaO 3.5-8, where $SiO_2$, $Al_2O_3$, $B_2O_3$, MgO, CaO, SrO and BaO represent the weight percent of the oxide components. The glass according to specific embodiments can have one or more of the following properties: $(MgO+CaO+SrO+BaO)/Al_2O_3 \geq 1.05$, an anneal point greater than or equal to 735° C., $T_{35k}-T_{liq}$ is greater than or equal to 60, a $T_{35k}$ less than or equal to 1250° C., a CTE less than about $39 \times 10^{-7}/°$ C., a Young's Modulus greater than or equal to 77 GPa, and a density less than or equal to 2.55 g/cm$^3$.

In one aspect, the disclosed glass includes a chemical fining agent. Such fining agents include, but are not limited to, $SnO_2$, $As_2O_3$, $Sb_2O_3$, F, Cl and Br, and in which the concentrations of the chemical fining agents are kept at a level of 0.5 mol % or less. Chemical fining agents may also include $CeO_2$, $Fe_2O_3$, and other oxides of transition metals, such as $MnO_2$. These oxides may introduce color to the glass via visible absorptions in their final valence state(s) in the glass, and thus their concentration is specifically kept at a level of 0.2 mol % or less.

Figure 2:
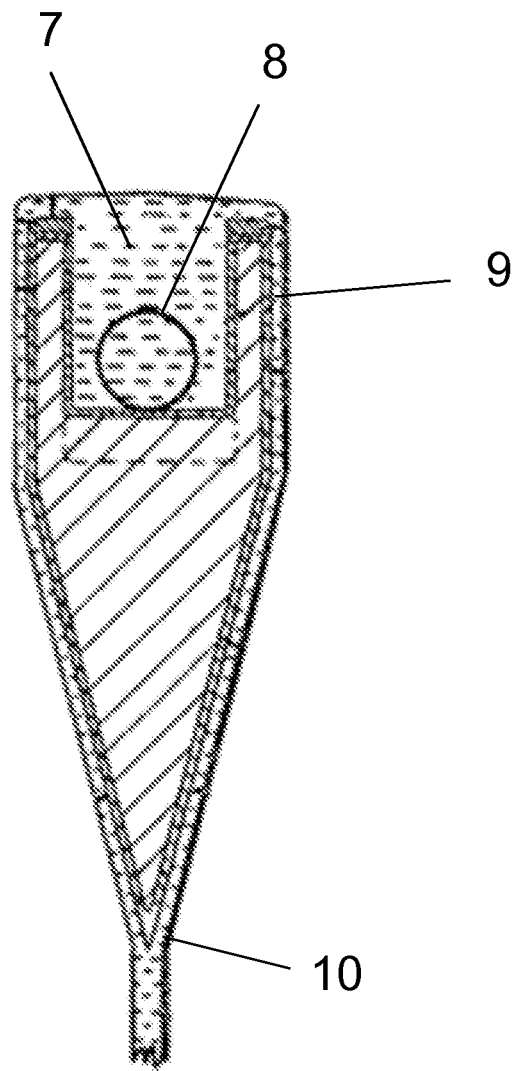
FIG. 2 is a cross section of the isopipe of FIG. 1 at section line 6.

In one aspect, the disclosed glasses are manufactured into sheet via the fusion process. The fusion draw process results in a pristine, fire-polished glass surface that reduces surface-mediated distortion to high resolution TFT backplanes and color filters. FIG. 1 is a schematic drawing of the fusion draw process at the position of the forming mandrel, or isopipe, so called because its gradient trough design produces the same (hence "iso") flow at all points along the length of the isopipe (from left to right). FIG. 2 is a schematic cross-section of the isopipe near position 6 in FIG. 1. Glass is introduced from the inlet 1, flows along the bottom of the trough 2 formed by the weir walls 3 to the compression end 4. Glass overflows the weir walls 4 on either side of the isopipe (see FIG. 2), and the two streams of glass join or fuse at the root 6. Edge directors 7 at either end of the isopipe serve to cool the glass and create a thicker strip at the edge called a bead. The bead is pulled down by pulling rolls, hence enabling sheet formation at high viscosity. By adjusting the rate at which sheet is pulled off the isopipe, it is possible to use the fusion draw process to produce a very wide range of thicknesses at a fixed melting rate.

The downdraw sheet drawing processes and, in particular, the fusion process described in U.S. Pat. Nos. 3,338,696 and 3,682,609 (both to Dockerty), which are incorporated by reference, can be used herein. Compared to other forming processes, such as the float process, the fusion process is preferred for several reasons. First, glass substrates made from the fusion process do not require polishing. Current glass substrate polishing is capable of producing glass substrates having an average surface roughness greater than about 0.5 nm (Ra), as measured by atomic force microscopy. The glass substrates produced by the fusion process have an average surface roughness as measured by atomic force microscopy of less than 0.5 nm. The substrates also have an average internal stress as measured by optical retardation which is less than or equal to 150 psi.

In one aspect, the disclosed glasses are manufactured into sheet form using the fusion process. While the disclosed glasses are compatible with the fusion process, they may also be manufactured into sheets or other ware through less demanding manufacturing processes. Such processes include slot draw, float, rolling, and other sheet-forming processes known to those skilled in the art.

Relative to these alternative methods for creating sheets of glass, the fusion process as discussed above is capable of creating very thin, very flat, very uniform sheets with a pristine surface. Slot draw also can result in a pristine surface, but due to change in orifice shape over time, accumulation of volatile debris at the orifice-glass interface, and the challenge of creating an orifice to deliver truly flat glass, the dimensional uniformity and surface quality of slot-drawn glass are generally inferior to fusion-drawn glass. The float process is capable of delivering very large, uniform sheets, but the surface is substantially compromised by contact with the float bath on one side, and by exposure to condensation products from the float bath on the other side. This means that float glass must be polished for use in high performance display applications.

Unfortunately, and in unlike the float process, the fusion process results in rapid cooling of the glass from high temperature, and this results in a high fictive temperature $T_f$; the fictive temperature can be thought of as representing discrepancy between the structural state of the glass and the state it would assume if fully relaxed at the temperature of interest. We consider now the consequences of reheating a glass with a glass transition temperature $T_g$ to a process temperature $T_p$ such that $T_p<T_g \leq T_f$. Since $T_p<T_f$ the structural state of the glass is out of equilibrium at $T_p$, and the glass will spontaneously relax toward a structural state that is in equilibrium at $T_p$. The rate of this relaxation scales inversely with the effective viscosity of the glass at $T_p$, such that high viscosity results in a slow rate of relaxation, and a low viscosity results in a fast rate of relaxation. The effective viscosity varies inversely with the fictive temperature of the glass, such that a low fictive temperature results in a high viscosity, and a high fictive temperature results in a comparatively low viscosity. Therefore, the rate of relaxation at $T_p$ scales directly with the fictive temperature of the glass. A process that introduces a high fictive temperature results in a comparatively high rate of relaxation when the glass is reheated at $T_p$.

One means to reduce the rate of relaxation at $T_p$ is to increase the viscosity of the glass at that temperature. The annealing point of a glass represents the temperature at which the glass has a viscosity of $10^{13.2}$ poise. As temperature decreases below the annealing point, the viscosity of the supercooled melt increases. At a fixed temperature below $T_g$, a glass with a higher annealing point has a higher viscosity than a glass with a lower annealing point. Therefore, to increase the viscosity of a substrate glass at $T_p$, one might choose to increase its annealing point. Unfortunately, it is generally the case that the composition changes necessary to increase the annealing point also increase viscosity at all other temperature. In particular, the fictive temperature of a glass made by the fusion process corresponds to a viscosity of about $10^{11}$-$10^{12}$ poise, so an increase in annealing point for a fusion-compatible glass generally increases its fictive temperature as well. For a given glass, higher fictive temperature results in lower viscosity at temperature below $T_g$, and thus increasing fictive temperature works against the viscosity increase that would otherwise be obtained by increasing the annealing point. To see a substantial change in the rate of relaxation at $T_p$, it is generally necessary to make relatively large changes in annealing point. An aspect of the disclosed glass is that it has an annealing point greater than about 730° C., more specifically greater than 735° C., and most specifically greater than 740° C. Such high annealing points results in acceptably low rates of thermal relaxation during low-temperature TFT processing, e.g., amorphous silicon or oxide TFT thermal cycles.

In practice, few alkali-free glasses have liquidus viscosities of the desired magnitude. Experience with substrate glasses suitable for amorphous silicon applications (e.g., Eagle XG®) indicated that edge directors could be held continuously at temperatures up to 60° below the liquidus temperature of certain alkali-free glasses. While it was understood that glasses with higher annealing points would require higher forming temperatures, it was not anticipated that the edge directors would be so much cooler relative to the center root temperature. A useful metric for keeping track of this effect is the difference between the delivery temperature onto the isopipe and the liquidus temperature of the glass, $T_{liq}$. In the fusion process, it is generally desirable to deliver glass at about 35,000 poise, and the temperature corresponding to a viscosity of 35,000 poise is conveniently represented as $T_{35k}$. For a particular delivery temperature, it is desirable to make $T_{35k}-T_{liq}$ as large possible, but for an amorphous silicon substrate, it is found that extended manufacturing campaigns can be conducted if $T_{35k}-T_{liq}$ is about 60° or more.

In an embodiment of the invention, $T_{10k}-T_{liq}$ is greater than 30° C.

In addition to this criterion, the fusion process should utilize a glass with a high liquidus viscosity. This is necessary so as to avoid devitrification products at interfaces with glass and to minimize visible devitrification products in the final glass. For a given glass compatible with fusion for a particular sheet size and thickness, adjusting the process so as to manufacture wider sheet or thicker sheet generally results in lower temperatures at either end of the isopipe (the forming mandrel for the fusion process). Thus, disclosed glasses with higher liquidus viscosities provide greater flexibility for manufacturing via the fusion process.

In the glass compositions described herein, $SiO_2$ serves as the basic glass former. In certain aspects, the concentration of $SiO_2$ can be greater than 57 weight percent in order to provide the glass with a density and chemical durability suitable for a flat panel display glass (e.g., an AMLCD glass), and a liquidus temperature (liquidus viscosity), which allows the glass to be formed by a downdraw process (e.g., a fusion process). In terms of an upper limit, in general, the $SiO_2$ concentration can be less than or equal to about 61 weight percent to allow batch materials to be melted using conventional, high volume, melting techniques, e.g., Joule melting in a refractory melter. As the concentration of $SiO_2$ increases, the 200 poise temperature (melting temperature) generally rises.

$Al_2O_3$ is another glass former used to make the glasses described herein. An $Al_2O_3$ concentration greater than or equal to 17.5 weight percent provides the glass with a low liquidus temperature and high viscosity, resulting in a high liquidus viscosity. The use of at least 17.5 weight percent $Al_2O_3$ also improves the glass's annealing point and modulus. In one aspect, the $Al_2O_3$ concentration is in the range of 17.5 and 20.5 weight percent. weight percent $B_2O_3$ is both a glass former and a flux that aids melting and lowers the melting temperature. Its impact on liquidus temperature is at least as great as its impact on viscosity, so increasing $B_2O_3$ can be used to increase the liquidus viscosity of a glass. To achieve these effects, the glass compositions described herein have $B_2O_3$ concentrations that are equal to or greater than 5 weight percent. As discussed above with regard to $SiO_2$, glass durability is very important for LCD applications. Durability can be controlled somewhat by elevated concentrations of alkaline earth oxides, and significantly reduced by elevated $B_2O_3$ content. Annealing point decreases as $B_2O_3$ increases, so it is desirable to keep $B_2O_3$ content low relative to its typical concentration in amorphous silicon substrates. Thus in one aspect, the glasses described herein have $B_2O_3$ concentrations that in the range of 5 to 8 weight percent In addition to the glass formers ($SiO_2$, $Al_2O_3$, and $B_2O_3$), the glasses described herein also include alkaline earth oxides. In one aspect, at least three alkaline earth oxides are part of the glass composition, e.g., MgO, CaO, and BaO, and, optionally, SrO. The alkaline earth oxides provide the glass with various properties important to melting, fining, forming, and ultimate use.

For certain embodiments of this invention, the alkaline earth oxides may be treated as what is in effect a single compositional component. This is because their impact upon viscoelastic properties, liquidus temperatures and liquidus phase relationships are qualitatively more similar to one another than they are to the glass forming oxides $SiO_2$, $Al_2O_3$ and $B_2O_3$. However, the alkaline earth oxides CaO, SrO and BaO can form feldspar minerals, notably anorthite ($CaAl_2Si_2O_8$) and celsian ($BaAl_2Si_2O_8$) and strontium-bearing solid solutions of same, but MgO does not participate in these crystals to a significant degree. Therefore, when a feldspar crystal is already the liquidus phase, a superaddition of MgO may serves to stabilize the liquid relative to the crystal and thus lower the liquidus temperature. At the same time, the viscosity curve typically becomes steeper, reducing melting temperatures while having little or no impact on low-temperature viscosities. In this sense, the addition of small amounts of MgO benefits melting by reducing melting temperatures, benefits forming by reducing liquidus temperatures and increasing liquidus viscosity, while preserving high annealing point and, thus, low compaction.

Calcium oxide present in the glass composition can produce low liquidus temperatures (high liquidus viscosities), high annealing points and moduli, and CTE's in the most desired ranges for flat panel applications, specifically, AMLCD applications. It also contributes favorably to chemical durability, and compared to other alkaline earth oxides, it is relatively inexpensive as a batch material. However, at high concentrations, CaO increases the density and CTE. Furthermore, at sufficiently low SiO2 concentrations, CaO may stabilize anorthite, thus decreasing liquidus viscosity. Accordingly, in one aspect, the CaO concentration can be greater than or equal to 4 weight percent. In another aspect, the CaO concentration of the glass composition is in the range of about 3 and 9 weight percent.

SrO and BaO can both contribute to low liquidus temperatures (high liquidus viscosities) and, thus, the glasses described herein will typically contain at least both of these oxides. However, the selection and concentration of these oxides are selected in order to avoid an increase in CTE and density and a decrease in modulus and annealing point. The relative proportions of SrO and BaO can be balanced so as to obtain a suitable combination of physical properties and liquidus viscosity such that the glass can be formed by a downdraw process.

To summarize the effects/roles of the central components of the glasses of the invention, SiO2 is the basic glass former. $Al_2O_3$ and $B_2O_3$ are also glass formers and can be selected as a pair with, for example, an increase in $B_2O_3$ and a corresponding decrease in $Al_2O_3$ being used to obtain a lower density and CTE, while an increase in $Al_2O_3$ and a corresponding decrease in $B_2O_3$ being used in increasing annealing point, modulus, and durability On top of these considerations, the glasses are specifically formable by a downdraw process, e.g., a fusion process, which means that the glass' liquidus viscosity needs to be relatively high. Individual alkaline earths play an important role in this regard since they can destabilize the crystalline phases that would otherwise form. BaO and SrO are particularly effective in controlling the liquidus viscosity and are included in the glasses of the invention for at least this purpose. As illustrated in the examples presented below, various combinations of the alkaline earths will produce glasses having high liquidus viscosities.

In addition to the above components, the glass compositions described herein can include various other oxides to adjust various physical, melting, fining, and forming attributes of the glasses. Examples of such other oxides include, but are not limited to, $TiO_2$, MnO, $Fe_2O_3$, ZnO, $Nb_2O_5$, $MoO_3$, $Ta_2O_5$, $WO_3$, $Y_2O_3$, $La_2O_3$ and $CeO_2$. In one aspect, the amount of each of these oxides can be less than or equal to 1 weight percent, more specifically 0.5 weight percent and their total combined concentration can be less than or equal to 2 weight percent, more specifically 1 weight percent. The glass compositions described herein can also include various contaminants associated with batch materials and/or introduced into the glass by the melting, fining, and/or forming equipment used to produce the glass, particularly $Fe_2O_2$ and $ZrO_2$. The glasses can also contain $SnO_2$ either as a result of Joule melting using tin-oxide electrodes and/or through the batching of tin containing materials, e.g., $SnO_2$, SnO, $SnCO_3$, $SnC_2O_2$, etc.

The glass compositions are generally alkali free; however, the glasses can contain some alkali contaminants. In the case of AMLCD applications, it is desirable to keep the alkali levels below 0.1 weight percent to avoid having a negative impact on thin film transistor (TFT) performance through diffusion of alkali ions from the glass into the silicon of the TFT. As used herein, an "alkali-free glass" is a glass having a total alkali concentration which is less than or equal to 0.1 weight percent, where the total alkali concentration is the sum of the $Na_2O$, $K_2O$, and $Li_2O$ concentrations. In one aspect, the total alkali concentration is less than or equal to 0.1 weight percent.

In one embodiment, on an oxide basis, the glass compositions described herein can have one or more or all of the following compositional characteristics: (i) an $As_2O_3$ concentration of at most 0.05 weight percent; (ii) an $Sb_2O_3$ concentration of at most 0.05 weight percent; (iii) a $SnO_2$ concentration of at most 0.25 weight percent.

$As_2O_3$ is an effective high temperature fining agent for AMLCD glasses, and in some aspects described herein, $As_2O_3$ is used for fining because of its superior fining properties. However, $As_2O_3$ is poisonous and requires special handling during the glass manufacturing process. Accordingly, in certain aspects, fining is performed without the use of substantial amounts of $As_2O_3$, i.e., the finished glass has at most 0.05 weight percent $As_2O_3$. In one aspect, no $As_2O_3$ is purposely used in the fining of the glass. In such cases, the finished glass will typically have at most 0.005 weight percent $As_2O_3$ as a result of contaminants present in the batch materials and/or the equipment used to melt the batch materials.

Although not as toxic as $As_2O_3$, $Sb_2O_3$ is also poisonous and requires special handling. In addition, $Sb_2O_3$ raises the density, raises the CTE, and lowers the annealing point in comparison to glasses that use $As_2O_3$ or $SnO_2$ as a fining agent. Accordingly, in certain aspects, fining is performed without the use of substantial amounts of $Sb_2O_3$, i.e., the finished glass has at most 0.05 weight percent $Sb_2O_3$. In another aspect, no $Sb_2O_3$ is purposely used in the fining of the glass. In such cases, the finished glass will typically have at most 0.005 weight percent $Sb_2O_3$ as a result of contaminants present in the batch materials and/or the equipment used to melt the batch materials.

Compared to $As_2O_3$ and $Sb_2O_3$ fining, tin fining (i.e., $SnO_2$ fining) is less effective, but $SnO_2$ is a ubiquitous material that has no known hazardous properties. Also, for many years, $SnO_2$ has been a component of AMLCD glasses through the use of tin oxide electrodes in the Joule melting of the batch materials for such glasses. The presence of $SnO_2$ in AMLCD glasses has not resulted in any known adverse effects in the use of these glasses in the manufacture of liquid crystal displays. However, high concentrations of $SnO_2$ are not preferred as this can result in the formation of crystalline defects in AMLCD glasses. In one aspect, the concentration of $SnO_2$ in the finished glass is less than or equal to 0.25 weight percent.

Tin fining can be used alone or in combination with other fining techniques if desired. For example, tin fining can be combined with halide fining, e.g., bromine fining. Other possible combinations include, but are not limited to, tin fining plus sulfate, sulfide, cerium oxide, mechanical bubbling, and/or vacuum fining. It is contemplated that these other fining techniques can be used alone.

The glasses described herein can be manufactured using various techniques known in the art. In one aspect, the glasses are made using a downdraw process such as, for example, a fusion downdraw process. In one aspect, described herein is a method for producing an alkali-free glass sheet by a downdraw process comprising selecting, melting, and fining batch materials so that the glass making up the sheets comprises $SiO_2$, $Al_2O_3$, $B_2O_3$, MgO, CaO and BaO, and, on wherein: (a) the fining is performed without the use of substantial amounts of arsenic (and, optionally, without the use of substantial amounts of antimony); and (b) a population of 50 sequential glass sheets produced by the downdraw process from the melted and fined batch materials has an average gaseous inclusion level of less than 0.10 gaseous inclusions/cubic centimeter, where each sheet in the population has a volume of at least 500 cubic centimeters.

EXAMPLES

The following examples are set forth below to illustrate exemplary embodiments. These examples are not intended to be inclusive of all embodiments of the subject matter disclosed herein, but rather to illustrate representative methods and results. These examples are not intended to exclude equivalents and variations of the present invention which are apparent to one skilled in the art.

Efforts have been made to ensure accuracy with respect to numbers (e.g., amounts, temperature, etc.) but some errors and deviations should be accounted for. Unless indicated otherwise, temperature is in ° C. or is at ambient temperature, and pressure is at or near atmospheric. The compositions themselves are given in weight percent on an oxide basis and have been normalized to 100%. There are numerous variations and combinations of reaction conditions, e.g., component concentrations, temperatures, pressures and other reaction ranges and conditions that can be used to optimize the product purity and yield obtained from the described process. Only reasonable and routine experimentation will be required to optimize such process conditions.

The glass properties set forth in Table 1 were determined in accordance with techniques conventional in the glass art. Thus, the linear coefficient of thermal expansion (CTE) over the temperature range 25-300° C. is expressed in terms of $\times 10^{-7}$/° C. and the annealing point is expressed in terms of ° C. These were determined from fiber elongation techniques (ASTM references E228-85 and C336, respectively). The density in terms of grams/cm$^3$ was measured via the Archimedes method (ASTM C693). The melting temperature in terms of ° C. (defined as the temperature at which the glass melt demonstrates a viscosity of 200 poises) was calculated employing a Fulcher equation fit to high temperature viscosity data measured via rotating cylinders viscometry (ASTM C965-81).

The liquidus temperature of the glass in terms of ° C. was measured using the standard gradient boat liquidus method of ASTM C829-81. This involves placing crushed glass particles in a platinum boat, placing the boat in a furnace having a region of gradient temperatures, heating the boat in an appropriate temperature region for 24 hours, and determining by means of microscopic examination the highest temperature at which crystals appear in the interior of the glass. More particularly, the glass sample is removed from the Pt boat in one piece, and examined using polarized light microscopy to identify the location and nature of crystals which have formed against the Pt and air interfaces, and in the interior of the sample. Because the gradient of the furnace is very well known, temperature vs. location can be well estimated, within 5-10° C. The temperature at which crystals are observed in the internal portion of the sample is taken to represent the liquidus of the glass (for the corresponding test period). Testing is sometimes carried out at longer times (e.g. 72 hours), in order to observe slower growing phases. The temperature corresponding to 200 poise and the viscosity at the liquidus (in poises) were determined from fits to high viscosity data using the Vogel-Fulcher-Tammann equation, $$\log(\eta)=A+B/(T-T_o)$$

in which T is temperature and A, B and $T_o$ are fitting parameters. To determine liquidus viscosity, the liquidus temperature is used as the value for T. Young's modulus values in terms of GPa were determined using a resonant ultrasonic spectroscopy technique of the general type set forth in ASTM E1875-00e1.

As can be seen in Table 1, the exemplary glasses have density, CTE, annealing point and Young's modulus values that make the glasses suitable for display applications, such as AMLCD substrate applications, and more particularly for low-temperature polysilicon and oxide thin film transistor applications. Although not shown in Table 1, the glasses have durabilities in acid and base media that are similar to those obtained from commercial AMLCD substrates, and thus are appropriate for AMLCD applications. The exemplary glasses can be formed using downdraw techniques, and in particular are compatible with the fusion process, via the aforementioned criteria.

The exemplary glasses of Tables 1 and 2 were prepared using a commercial sand as a silica source, milled such that 90% by weight passed through a standard U.S. 100 mesh sieve. Alumina was the alumina source, periclase was the source for MgO, limestone the source for CaO, strontium carbonate, strontium nitrate or a mix thereof was the source for SrO, barium carbonate was the source for BaO, and tin (IV) oxide was the source for $SnO_2$. The raw materials were thoroughly mixed, loaded into a platinum vessel suspended in a furnace heated by silicon carbide glowbars, melted and stirred for several hours at temperatures in the range of 1600 and 1650° C. to ensure homogeneity, and delivered through an orifice at the base of the platinum vessel. The resulting patties of glass were annealed at or near the annealing point, and then subjected to various experimental methods to determine physical, viscous and liquidus attributes.

These methods are not unique, and the glasses of Table 1 can be prepared using standard methods well-known to those skilled in the art. Such methods include a continuous melting process, such as would be performed in a continuous melting process, wherein the melter used in the continuous melting process is heated by gas, by electric power, or combinations thereof.

Raw materials appropriate for producing the disclosed glass include commercially available sands as sources for $SiO_2$; alumina, aluminum hydroxide, hydrated forms of alumina, and various aluminosilicates, nitrates and halides as sources for $Al_2O_3$; boric acid, anhydrous boric acid and boric oxide as sources for $B_2O_3$; periclase, dolomite (also a source of CaO), magnesia, magnesium carbonate, magnesium hydroxide, and various forms of magnesium silicates, aluminosilicates, nitrates and halides as sources for MgO; limestone, aragonite, dolomite (also a source of MgO), wolastonite, and various forms of calcium silicates, aluminosilicates, nitrates and halides as sources for CaO; and oxides, carbonates, nitrates and halides of strontium and barium. If a chemical fining agent is desired, tin can be added as $SnO_2$, as a mixed oxide with another major glass component (e.g., $CaSnO_3$), or in oxidizing conditions as SnO, tin oxalate, tin halide, or other compounds of tin known to those skilled in the art.

The glasses in Table 1 contain $SnO_2$ as a fining agent, but other chemical fining agents could also be employed to obtain glass of sufficient quality for TFT substrate applications. For example, the disclosed glasses could employ any one or combinations of $As_2O_3$, $Sb_2O_3$, $CeO_2$, $Fe_2O_3$, and halides as deliberate additions to facilitate fining, and any of these could be used in conjunction with the $SnO_2$ chemical fining agent shown in the examples. Of these, $As_2O_3$ and $Sb_2O_3$ are generally recognized as hazardous materials, subject to control in waste streams such as might be generated in the course of glass manufacture or in the processing of TFT panels. It is therefore desirable to limit the concentration of $As_2O_3$ and $Sb_2O_3$ individually or in combination to no more than 0.005 mol %.

In addition to the elements deliberately incorporated into the disclosed nearly all stable elements in the periodic table are present in glasses at some level, either through low levels of contamination in the raw materials, through high-temperature erosion of refractories and precious metals in the manufacturing process, or through deliberate introduction at low levels to fine tune the attributes of the final glass. For example, zirconium may be introduced as a contaminant via interaction with zirconium-rich refractories. As a further example, platinum and rhodium may be introduced via interactions with precious metals. As a further example, iron may be introduced as a tramp in raw materials, or deliberately added to enhance control of gaseous inclusions. As a further example, manganese may be introduced to control color or to enhance control of gaseous inclusions. As a further example, alkalis may be present as a tramp component at levels up to about 0.1 mol % for the combined concentration of $Li_2O$, $Na_2O$ and $K_2O$.

Hydrogen is inevitably present in the form of the hydroxyl anion, $OH^-$, and its presence can be ascertained via standard infrared spectroscopy techniques. Dissolved hydroxyl ions significantly and nonlinearly impact the annealing point of the disclosed glasses, and thus to obtain the desired annealing point it may be necessary to adjust the concentrations of major oxide components so as to compensate. Hydroxyl ion concentration can be controlled to some extent through choice of raw materials or choice of melting system. For example, boric acid is a major source of hydroxyls, and replacing boric acid with boric oxide can be a useful means to control hydroxyl concentration in the final glass. The same reasoning applies to other potential raw materials comprising hydroxyl ions, hydrates, or compounds comprising physisorbed or chemisorbed water molecules. If burners are used in the melting process, then hydroxyl ions can also be introduced through the combustion products from combustion of natural gas and related hydrocarbons, and thus it may be desirable to shift the energy used in melting from burners to electrodes to compensate. Alternatively, one might instead employ an iterative process of adjusting major oxide components so as to compensate for the deleterious impact of dissolved hydroxyl ions.

Sulfur is often present in natural gas, and likewise is a tramp component in many carbonate, nitrate, halide, and oxide raw materials. In the form of $SO_2$, sulfur can be a troublesome source of gaseous inclusions. The tendency to form $SO_2$-rich defects can be managed to a significant degree by controlling sulfur levels in the raw materials, and by incorporating low levels of comparatively reduced multivalent cations into the glass matrix. While not wishing to be bound by theory, it appears that $SO_2$-rich gaseous inclusions arise primarily through reduction of sulfate ($SO_4^=$) dissolved in the glass. The elevated barium concentrations of the disclosed glasses appear to increase sulfur retention in the glass in early stages of melting, but as noted above, barium is required to obtain low liquidus temperature, and hence high $T_{35k}-T_{liq}$ and high liquidus viscosity. Deliberately controlling sulfur levels in raw materials to a low level is a useful means of reducing dissolved sulfur (presumably as sulfate) in the glass. In particular, sulfur is specifically less than 200 ppm by weight in the batch materials, and more specifically less than 100 ppm by weight in the batch materials.

Reduced multivalents can also be used to control the tendency of the disclosed glasses to form $SO_2$ blisters. While not wishing to be bound to theory, these elements behave as potential electron donors that suppress the electromotive force for sulfate reduction. Sulfate reduction can be written in terms of a half reaction such as $SO_4^= \rightarrow SO_2 + O_2 + 2e-$ where e– denotes an electron. The "equilibrium constant" for the half reaction is $K_{eq} = [SO_2][O_2][e-]^2/[SO_4^=]$ where the brackets denote chemical activities. Ideally one would like to force the reaction so as to create sulfate from $SO_2$, $O_2$ and 2e–. Adding nitrates, peroxides, or other oxygen-rich raw materials may help, but also may work against sulfate reduction in the early stages of melting, which may counteract the benefits of adding them in the first place. $SO_2$ has very low solubility in most glasses, and so is impractical to add to the glass melting process. Electrons may be "added" through reduced multivalents. For example, an appropriate electron-donating half reaction for ferrous iron ($Fe^{2+}$) is expressed as $2Fe^{2+} \rightarrow 2Fe^{3+} + 2e-$ This "activity" of electrons can force the sulfate reduction reaction to the left, stabilizing $SO_4^=$ in the glass. Suitable reduced multivalents include, but are not limited to, $Fe^{e+}$, $Mn^{2+}$, $Sn^{2+}$, $Sb^{3+}$, $As^{3+}$, $V^{3+}$, $Ti^{3+}$, and others familiar to those skilled in the art. In each case, it may be important to minimize the concentrations of such components so as to avoid deleterious impact on color of the glass, or in the case of As and Sb, to avoid adding such components at a high enough level so as to complication of waste management in an end-user's process.

In addition to the major oxides components of the disclosed glasses, and the minor or tramp constituents noted above, halides may be present at various levels, either as contaminants introduced through the choice of raw materials, or as deliberate components used to eliminate gaseous inclusions in the glass. As a fining agent, halides may be incorporated at a level of about 0.4 mol % or less, though it is generally desirable to use lower amounts if possible to avoid corrosion of off-gas handling equipment. In a preferred embodiment, the concentration of individual halide elements are below about 200 ppm by weight for each individual halide, or below about 800 ppm by weight for the sum of all halide elements.

In addition to these major oxide components, minor and tramp components, multivalents and halide fining agents, it may be useful to incorporate low concentrations of other colorless oxide components to achieve desired physical, optical or viscoelastic properties. Such oxides include, but are not limited to, $TiO_2$, $ZrO_2$, $HfO_2$, $Nb_2O_5$, $Ta_2O_5$, $MoO_3$, $WO_3$, $ZnO$, $In_2O_3$, $Ga_2O_3$, $Bi_2O_3$, $GeO_2$, $PbO$, $SeO_3$, $TeO_2$, $Y_2O_3$, $La_2O_3$, $Gd_2O_3$, and others known to those skilled in the art. Through an iterative process of adjusting the relative proportions of the major oxide components of the disclosed glasses, such colorless oxides can be added to a level of up to about 2 mol % without unacceptable impact to annealing point, $T_{10k}-T_{liq}$ or liquidus viscosity.

Examples of glass compositions according to embodiments are disclosed below in Table 1.

TABLE 1

| | 1 | 2 | 3 | 4 | 5 | 6 |
|---|---|---|---|---|---|---|
| mole % | | | | | | |
| $SiO_2$ | 66.4 | 66.07 | 65.77 | 66.17 | 66.41 | 66.54 |
| $Al_2O_3$ | 12.05 | 12.44 | 12.18 | 12.11 | 12.16 | 12.22 |
| $B_2O_3$ | 6.64 | 6.92 | 6.63 | 6.63 | 6.84 | 6.52 |
| MgO | 5.64 | 5.29 | 6.38 | 6.2 | 5.14 | 5.35 |
| CaO | 5.32 | 5.26 | 5.37 | 5.28 | 5.25 | 5.28 |
| SrO | 2.05 | 2.3 | 1.45 | 1.4 | 2.54 | 2.35 |
| BaO | 1.74 | 1.57 | 2.05 | 2.07 | 1.51 | 1.59 |

TABLE 1-continued

|  | | | | | | |
|---|---|---|---|---|---|---|
| SnO$_2$ | 0.07 | 0.08 | 0.07 | 0.05 | 0.08 | 0.08 |
| Fe$_2$O$_3$ | 0.01 | 0.01 | 0.01 | 0.01 | 0.01 | 0.01 |
| ZrO$_2$ | 0.01 | 0.01 | 0.02 | 0.03 | | |
| weight % | | | | | | |
| SiO$_2$ | 59.504 | 59.023 | 58.998 | 59.366 | 59.362 | 59.539 |
| Al$_2$O$_3$ | 18.33 | 18.86 | 18.54 | 18.44 | 18.45 | 18.56 |
| B$_2$O$_3$ | 6.89 | 7.16 | 6.89 | 6.89 | 7.08 | 6.76 |
| MgO | 3.39 | 3.17 | 3.84 | 3.73 | 3.08 | 3.21 |
| CaO | 4.45 | 4.39 | 4.5 | 4.42 | 4.38 | 4.41 |
| SrO | 3.17 | 3.54 | 2.25 | 2.16 | 3.92 | 3.62 |
| BaO | 3.99 | 3.58 | 4.69 | 4.73 | 3.45 | 3.62 |
| SnO$_2$ | 0.167 | 0.17 | 0.168 | 0.119 | 0.17 | 0.17 |
| Fe$_2$O$_3$ | 0.031 | 0.031 | 0.032 | 0.032 | 0.03 | 0.031 |
| ZrO$_2$ | 0.024 | 0.025 | 0.043 | 0.062 | 0.023 | 0.025 |
| Properties | | | | | | |
| RO/Al$_2$O$_3$ | 1.22 | 1.16 | 1.25 | 1.23 | 1.19 | 1.19 |
| Strain point (° C.) | 689 | 692 | 690 | 689 | 690 | 693 |
| Anneal point (° C.) | 741 | 744 | 742 | 740 | 742 | 745 |
| Softening Point (° C.) | 974 | 973 | 972 | 975 | 975 | 978 |
| CTE (10$^{-7}$/° C.) | 35.2 | 35.2 | 34.5 | 34.7 | 35.3 | 34.7 |
| Density (g/cm$^3$) | 2.521 | 2.517 | 2.525 | 2.522 | 2.519 | 2.522 |
| Poisson's ratio | 0.237 | 0.231 | 0.233 | 0.235 | 0.229 | 0.237 |
| Youngs mod (GPa) | 79.29 | 78.94 | 79.43 | 79.36 | 78.88 | 79.29 |
| Specific modulus (GPa/g/cm$^3$) | 31.45 | 31.36 | 31.85 | 31.47 | 31.48 | 31.48 |
| T$_{200\,P}$ (° C.) | 1577 | 1581 | 1570 | 1577 | 1574 | 1580 |
| T$_{10\,kP}$ (° C.) | 1282 | 1286 | 1282 | 1281 | 1283 | 1288 |
| T$_{35\,kP}$ (° C.) | 1214 | 1218 | 1216 | 1214 | 1216 | 1221 |
| T$_{100\,kP}$ (° C.) | 1165 | 1169 | 1168 | 1165 | 1167 | 1171 |
| T$_{130\,kP}$ (° C.) | 1153 | 1157 | 1156 | 1153 | 1156 | 1160 |
| Liq Temp (° C.) | 1140 | 1140 | 1140 | 1140 | 1140 | 1130 |
| Liq Viscosity (P) | 1.8E+05 | 1.9E+05 | 1.9E+05 | 1.8E+05 | 1.9E+05 | 1.9E+05 |
| T$_{35\,kP}$ − T$_{liq}$ | 74 | 78 | 76 | 74 | 76 | 76 |
| T$_{10K}$ − T$_{liq}$ | 142 | 146 | 142 | 141 | 143 | 143 |

|  | 7 | 8 | 9 | 10 | 11 | 12 |
|---|---|---|---|---|---|---|
| mole % | | | | | | |
| SiO$_2$ | 66.59 | 66.62 | 66.67 | 66.72 | 66.4 | 66.55 |
| Al$_2$O$_3$ | 12.2 | 12.18 | 12.02 | 11.78 | 12.2 | 12.16 |
| B$_2$O$_3$ | 6.56 | 7.19 | 6.33 | 5.92 | 6.73 | 6.85 |
| MgO | 5.27 | 4.63 | 5.37 | 6.51 | 5.54 | 5.3 |
| CaO | 5.29 | 5.18 | 5.27 | 5.32 | 5.31 | 5.27 |
| SrO | 2.35 | 2.47 | 2.57 | 2.28 | 2.09 | 2.24 |
| BaO | 1.58 | 1.58 | 1.62 | 1.33 | 1.59 | 1.5 |
| SnO$_2$ | 0.07 | 0.07 | 0.08 | 0.07 | 0.08 | 0.08 |
| Fe$_2$O$_3$ | 0.01 | 0.01 | 0.01 | 0.01 | 0.01 | 0.01 |
| ZrO$_2$ | | | | | | |
| weight % | | | | | | |
| SiO$_2$ | 59.582 | 59.401 | 59.638 | 60.367 | 59.54 | 59.675 |
| Al$_2$O$_3$ | 18.52 | 18.43 | 18.24 | 18.08 | 18.56 | 18.5 |
| B$_2$O$_3$ | 6.8 | 7.43 | 6.56 | 6.21 | 6.99 | 7.12 |
| MgO | 3.16 | 2.77 | 3.22 | 3.95 | 3.33 | 3.19 |
| CaO | 4.42 | 4.31 | 4.4 | 4.49 | 4.44 | 4.41 |
| SrO | 3.63 | 3.8 | 3.96 | 3.55 | 3.23 | 3.46 |
| BaO | 3.61 | 3.59 | 3.7 | 3.08 | 3.63 | 3.37 |
| SnO$_2$ | 0.167 | 0.16 | 0.17 | 0.17 | 0.17 | 0.17 |
| Fe$_2$O$_3$ | 0.031 | 0.03 | 0.031 | 0.032 | 0.031 | 0.031 |
| ZrO$_2$ | 0.022 | 0.025 | 0.024 | 0.02 | 0.02 | 0.025 |
| Properties | | | | | | |
| RO/Al$_2$O$_3$ | 1.19 | 1.14 | 1.23 | 1.31 | 1.19 | 1.18 |
| Strain point (° C.) | 689 | 690 | 692 | 694 | 692 | 689 |
| Anneal point (° C.) | 741 | 743 | 743 | 745 | 743 | 742 |
| Softening Point (° C.) | 977 | 977 | 976 | 976 | 976 | 975 |
| CTE (10$^{-7}$/° C.) | 34.9 | 35.2 | 35.9 | 35.2 | 34.8 | 34.7 |
| Density (g/cm$^3$) | 2.523 | 2.511 | 2.529 | 2.524 | 2.516 | 2.512 |
| Poisson's ratio | 0.236 | 0.238 | 0.234 | 0.236 | 0.241 | 0.249 |
| Youngs mod (GPa) | 79.08 | 77.84 | 79.22 | 80.67 | 79.63 | 79.50 |
| Specific modulus (GPa/g/cm$^3$) | 31.34 | 31.00 | 31.32 | 31.96 | 31.65 | 31.65 |
| T$_{200\,P}$ (° C.) | 1600 | 1584 | 1577 | 1573 | 1580 | 1583 |
| T$_{10\,kP}$ (° C.) | 1295 | 1289 | 1283 | 1284 | 1286 | 1287 |
| T$_{35\,kP}$ (° C.) | 1226 | 1221 | 1216 | 1218 | 1219 | 1220 |
| T$_{100\,kP}$ (° C.) | 1175 | 1172 | 1167 | 1169 | 1170 | 1170 |
| T$_{130\,kP}$ (° C.) | 1164 | 1160 | 1155 | 1158 | 1158 | 1158 |

TABLE 1-continued

|  |  |  |  |  |  |  |
|---|---|---|---|---|---|---|
| Liq Temp (° C.) | 1140 | 1120 | 1140 | 1155 | 1140 | 1130 |
| Liq Viscosity (P) | 2.2E+05 | 3.4E+05 | 1.9E+05 | 1.4E+05 | 2.0E+05 | 2.5E+05 |
| $T_{35\ kP} - T_{liq}$ | 86 | 101 | 76 | 63 | 79 | 90 |
| $T_{10K} - T_{liq}$ | 155 | 169 | 143 | 129 | 146 | 157 |

|  | 13 | 14 | 15 | 16 | 17 | 18 |
|---|---|---|---|---|---|---|
| mole % |  |  |  |  |  |  |
| $SiO_2$ | 66.6 | 66.76 | 66.68 | 66.56 | 66.68 | 66.66 |
| $Al_2O_3$ | 12.18 | 12.12 | 12.2 | 12.06 | 12.2 | 12.04 |
| $B_2O_3$ | 6.52 | 7.05 | 6.69 | 6.56 | 6.69 | 6.54 |
| MgO | 5.78 | 4.49 | 5.37 | 5.92 | 5.37 | 5.39 |
| CaO | 5.26 | 5.19 | 5.17 | 5.24 | 5.17 | 5.29 |
| SrO | 1.44 | 2.11 | 1.6 | 1.45 | 1.6 | 2.33 |
| BaO | 2.07 | 2.12 | 2.16 | 2.06 | 2.16 | 1.59 |
| $SnO_2$ | 0.08 | 0.07 | 0.07 | 0.08 | 0.07 | 0.07 |
| $Fe_2O_3$ | 0.01 | 0.01 | 0.01 | 0.01 | 0.01 | 0.01 |
| $ZrO_2$ |  |  |  |  |  |  |
| weight % |  |  |  |  |  |  |
| $SiO_2$ | 59.638 | 59.227 | 59.474 | 59.662 | 59.474 | 59.723 |
| $Al_2O_3$ | 18.5 | 18.24 | 18.46 | 18.35 | 18.46 | 18.31 |
| $B_2O_3$ | 6.76 | 7.25 | 6.91 | 6.81 | 6.91 | 6.79 |
| MgO | 3.47 | 2.67 | 3.21 | 3.56 | 3.21 | 3.24 |
| CaO | 4.4 | 4.3 | 4.3 | 4.38 | 4.3 | 4.42 |
| SrO | 2.22 | 3.23 | 2.46 | 2.24 | 2.46 | 3.6 |
| BaO | 4.73 | 4.81 | 4.92 | 4.72 | 4.92 | 3.64 |
| $SnO_2$ | 0.17 | 0.16 | 0.16 | 0.17 | 0.16 | 0.167 |
| $Fe_2O_3$ | 0.031 | 0.03 | 0.031 | 0.031 | 0.031 | 0.031 |
| $ZrO_2$ | 0.03 | 0.02 | 0.03 | 0.02 | 0.03 | 0.02 |
| Properties |  |  |  |  |  |  |
| $RO/Al_2O_3$ | 1.19 | 1.15 | 1.17 | 1.22 | 1.17 | 1.21 |
| Strain point (° C.) | 693 | 691 | 691 | 691 | 691 | 692 |
| Anneal point (° C.) | 745 | 745 | 744 | 743 | 744 | 744 |
| Softening Point (° C.) | 978 | 982 | 983 | 978 | 983 | 974 |
| CTE ($10^{-7}$/° C.) | 35.0 | 35.3 | 34.5 | 35.2 | 34.5 | 34.6 |
| Density (g/cm$^3$) | 2.519 | 2.520 | 2.518 | 2.519 | 2.518 | 2.521 |
| Poisson's ratio | 0.233 | 0.238 | 0.234 | 0.226 | 0.234 | 0.238 |
| Youngs mod (GPa) | 79.15 | 77.63 | 78.39 | 78.60 | 78.39 | 79.43 |
| Specific modulus (GPa/g/cm$^3$) | 31.84 | 31.82 | 31.72 | 31.20 | 31.13 | 31.13 |
| $T_{200\ P}$ (° C.) | 1587 | 1597 | 1592 | 1575 | 1592 | 1574 |
| $T_{10\ kP}$ (° C.) | 1289 | 1297 | 1297 | 1285 | 1297 | 1283 |
| $T_{35\ kP}$ (° C.) | 1222 | 1228 | 1228 | 1219 | 1228 | 1216 |
| $T_{100\ kP}$ (° C.) | 1172 | 1178 | 1177 | 1170 | 1177 | 1167 |
| $T_{130\ kP}$ (° C.) | 1161 | 1166 | 1165 | 1158 | 1165 | 1155 |
| Liq Temp (° C.) | 1140 | 1120 | 1140 | 1140 | 1140 | 1110 |
| Liq Viscosity (P) | 2.1E+05 | 3.9E+05 | 2.3E+05 | 2.0E+05 | 2.3E+05 | 4.0E+05 |
| $T_{35\ kP} - T_{liq}$ | 82 | 108 | 88 | 79 | 88 | 106 |
| $T_{10K} - T_{liq}$ | 149 | 177 | 157 | 145 | 157 | 173 |

|  | 19 | 20 | 21 | 22 | 23 | 24 |
|---|---|---|---|---|---|---|
| mole % |  |  |  |  |  |  |
| $SiO_2$ | 66.64 | 66.52 | 66.64 | 65.95 | 66.1 | 66.19 |
| $Al_2O_3$ | 12.39 | 12.09 | 12.39 | 12.01 | 12.25 | 12.13 |
| $B_2O_3$ | 6.88 | 6.5 | 6.88 | 6.7 | 7.01 | 6.53 |
| MgO | 4.88 | 6 | 4.88 | 5.32 | 5.23 | 5.47 |
| CaO | 4.9 | 5.23 | 4.9 | 5.28 | 4.07 | 5.29 |
| SrO | 1.82 | 1.44 | 1.82 | 3.22 | 2.84 | 2.58 |
| BaO | 2.34 | 2.06 | 2.34 | 1.36 | 2.33 | 1.65 |
| $SnO_2$ | 0.08 | 0.07 | 0.08 | 0.07 | 0.07 | 0.08 |
| $Fe_2O_3$ | 0.01 | 0.01 | 0.01 | 0.01 | 0.01 | 0.01 |
| $ZrO_2$ |  |  |  |  |  |  |
| weight % |  |  |  |  |  |  |
| $SiO_2$ | 59.028 | 59.646 | 59.028 | 58.924 | 58.246 | 59.141 |
| $Al_2O_3$ | 18.62 | 18.4 | 18.62 | 18.21 | 18.31 | 18.39 |
| $B_2O_3$ | 7.06 | 6.75 | 7.06 | 6.94 | 7.16 | 6.76 |
| MgO | 2.9 | 3.61 | 2.9 | 3.19 | 3.09 | 3.28 |
| CaO | 4.05 | 4.38 | 4.05 | 4.4 | 3.35 | 4.41 |
| SrO | 2.78 | 2.22 | 2.78 | 4.956 | 4.32 | 3.978 |
| BaO | 5.28 | 4.72 | 5.28 | 3.11 | 5.25 | 3.76 |
| $SnO_2$ | 0.169 | 0.156 | 0.169 | 0.163 | 0.16 | 0.17 |

TABLE 1-continued

| | | | | | | |
|---|---|---|---|---|---|---|
| Fe$_2$O$_3$ | 0.03 | 0.031 | 0.03 | 0.031 | 0.029 | 0.031 |
| ZrO$_2$ | 0.02 | 0.03 | 0.024 | 0.023 | 0.023 | 0.024 |
| Properties | | | | | | |
| RO/Al$_2$O$_3$ | 1.13 | 1.22 | 1.13 | 1.26 | 1.18 | 1.24 |
| Strain point (° C.) | 694 | 690 | 694 | 685 | 687 | 690 |
| Anneal point (° C.) | 747 | 742 | 747 | 737 | 740 | 741 |
| Softening Point (° C.) | 982 | 975 | 982 | 970 | 978 | 973 |
| CTE (10$^{-7}$/° C.) | 34.7 | 35.2 | 34.7 | 37.3 | 35.7 | 35.9 |
| Density (g/cm$^3$) | 2.528 | 2.521 | 2.528 | 2.536 | 2.543 | 2.530 |
| Poisson's ratio | 0.247 | 0.240 | 0.247 | 0.254 | 0.241 | 0.235 |
| Youngs mod (GPa) | 79.01 | 79.57 | 79.01 | 80.53 | 77.98 | 79.22 |
| Specific modulus (GPa/g/cm$^3$) | 31.26 | 31.56 | 31.84 | 31.84 | 31.33 | 31.33 |
| T$_{200\,P}$ (° C.) | 1594 | 1584 | 1594 | 1570 | 1580 | 1578 |
| T$_{10\,kP}$ (° C.) | 1297 | 1287 | 1297 | 1276 | 1289 | 1281 |
| T$_{35\,kP}$ (° C.) | 1229 | 1219 | 1229 | 1209 | 1221 | 1214 |
| T$_{100\,kP}$ (° C.) | 1178 | 1169 | 1178 | 1159 | 1171 | 1165 |
| T$_{130\,kP}$ (° C.) | 1167 | 1157 | 1167 | 1148 | 1159 | 1153 |
| Liq Temp (° C.) | 1125 | 1140 | 1125 | 1120 | 1120 | 1120 |
| Liq Viscosity (P) | 3.5E+05 | 2.0E+05 | 3.5E+05 | 2.5E+05 | 3.3E+05 | 3.3E+05 |
| T$_{35\,kP}$ − T$_{liq}$ | 104 | 79 | 104 | 89 | 101 | 101 |
| T$_{10K}$ − T$_{liq}$ | 172 | 147 | 172 | 156 | 169 | 169 |

| | 25 | 26 | 27 | 28 | 29 | 30 |
|---|---|---|---|---|---|---|
| mole % | | | | | | |
| SiO$_2$ | 66.1 | 66.14 | 66.34 | 66.69 | 65.96 | 66.41 |
| Al$_2$O$_3$ | 12.25 | 12.17 | 12.08 | 12.28 | 11.73 | 11.95 |
| B$_2$O$_3$ | 7.01 | 6.68 | 6.72 | 6.44 | 6.79 | 6.46 |
| MgO | 5.23 | 5.56 | 5.76 | 5.77 | 5.76 | 5.84 |
| CaO | 4.07 | 5.33 | 5.31 | 5.23 | 5.32 | 5.28 |
| SrO | 2.84 | 2.35 | 1.75 | 1.62 | 1.85 | 2.45 |
| BaO | 2.33 | 1.61 | 1.89 | 1.83 | 2.44 | 1.5 |
| SnO$_2$ | 0.07 | 0.08 | 0.08 | 0.08 | 0.08 | 0.08 |
| Fe$_2$O$_3$ | 0.01 | 0.01 | 0.01 | 0.01 | 0.01 | 0.01 |
| ZrO$_2$ | | | | | | |
| weight % | | | | | | |
| SiO$_2$ | 58.246 | 59.208 | 59.452 | 59.811 | 58.74 | 59.692 |
| Al$_2$O$_3$ | 18.31 | 18.49 | 18.37 | 18.69 | 17.73 | 18.23 |
| B$_2$O$_3$ | 7.16 | 6.93 | 6.98 | 6.69 | 7.01 | 6.73 |
| MgO | 3.09 | 3.34 | 3.46 | 3.47 | 3.44 | 3.52 |
| CaO | 3.35 | 4.45 | 4.44 | 4.38 | 4.42 | 4.43 |
| SrO | 4.32 | 3.63 | 2.7 | 2.5 | 2.84 | 3.8 |
| BaO | 5.25 | 3.67 | 4.32 | 4.18 | 5.54 | 3.32 |
| SnO$_2$ | 0.16 | 0.17 | 0.17 | 0.17 | 0.17 | 0.17 |
| Fe$_2$O$_3$ | 0.029 | 0.031 | 0.031 | 0.031 | 0.032 | 0.032 |
| ZrO$_2$ | 0.023 | 0.023 | 0.023 | 0.025 | 0.024 | 0.024 |
| Properties | | | | | | |
| RO/Al$_2$O$_3$ | 1.18 | 1.22 | 1.22 | 1.18 | 1.31 | 1.26 |
| Strain point (° C.) | 687 | 690 | 690 | 695 | 687 | 691 |
| Anneal point (° C.) | 740 | 742 | 741 | 747 | 739 | 742 |
| Softening Point (° C.) | 978 | 974 | 975 | 979 | 973 | 974 |
| CTE (10$^{-7}$/° C.) | 35.7 | 35.3 | 35.1 | 34.2 | 35.8 | 34.9 |
| Density (g/cm$^3$) | 2.543 | 2.524 | 2.520 | 2.516 | 2.528 | 2.523 |
| Poisson's ratio | 0.241 | 0.239 | 0.247 | 0.243 | 0.236 | 0.236 |
| Youngs mod (GPa) | 77.98 | 79.63 | 79.91 | 79.84 | 77.91 | 79.57 |
| Specific modulus (GPa/g/cm$^3$) | 31.55 | 31.82 | 31.73 | 31.82 | 31.54 | 31.54 |
| T$_{200\,P}$ (° C.) | 1580 | 1577 | 1578 | 1579 | 1598 | 1578 |
| T$_{10\,kP}$ (° C.) | 1289 | 1282 | 1285 | 1286 | 1290 | 1282 |
| T$_{35\,kP}$ (° C.) | 1221 | 1215 | 1218 | 1219 | 1221 | 1215 |
| T$_{100\,kP}$ (° C.) | 1171 | 1166 | 1168 | 1170 | 1171 | 1166 |
| T$_{130\,kP}$ (° C.) | 1159 | 1154 | 1156 | 1159 | 1159 | 1155 |
| Liq Temp (° C.) | 1120 | 1125 | 1135 | 1140 | 1140 | 1140 |
| Liq Viscosity (P) | 3.3E+05 | 2.6E+05 | 2.2E+05 | 2.0E+05 | 2.0E+05 | 1.8E+05 |
| T$_{35\,kP}$ − T$_{liq}$ | 101 | 90 | 83 | 79 | 81 | 75 |
| T$_{10K}$ − T$_{liq}$ | 169 | 157 | 150 | 146 | 150 | 142 |

Various modifications and variations can be made to the materials, methods, and articles described herein. Other aspects of the materials, methods, and articles described herein will be apparent from consideration of the specification and practice of the materials, methods, and articles disclosed herein. It is intended that the specification and examples be considered as exemplary.

What is claimed is:

1. A glass comprising, in weight percent on an oxide basis in the ranges:

SiO$_2$ 58-60
Al$_2$O$_3$ 17.5-20
B$_2$O$_3$ 6.21-7.25
MgO 3-5
CaO 3-4.5
SrO 1.5-6
BaO 3-5, the glass exhibiting a strain point >685° C., Youngs modulus >77 GPa, a density <2.55g/cm$^3$, and a temperature at a viscosity of about 10,000 poises (T$_{10k}$)<1300° C.

2. The glass of claim 1, wherein the glass comprises Al$_2$O$_3$, in weight percent on an oxide basis in the range 17.8-20.

3. The glass of claim 1, wherein the glass comprises MgO, in weight percent on an oxide basis 3-4.5.

4. The glass of claim 1, wherein the glass comprises SrO, in weight percent on an oxide basis 1.5-4.5.

5. The glass of claim 1, wherein the glass has an annealing point greater than 730° C.

6. The glass of claim 1, having an anneal point greater than or equal to 735° C.

7. The glass of claim 1, wherein the glass has a specific modulus greater than 31.

8. The glass of claim 1, wherein the glass satisfies the following: T$_{10k}$−T$_{liq}$>30° C.

9. The glass of claim 1, having a T$_{35k}$ in the range of about 1200° C. to about 1250° C.

10. The glass of claim 1, wherein the T$_{35k}$ is less than or equal to about 1235° C.

11. The glass of claim 1, wherein T$_{35k}$−T$_{liq}$ is greater than or equal to 60° C.

12. The glass of claim 1, having a CTE in the range of about 28–42×10$^{-7}$/° C.

13. The glass of claim 1 wherein the liquidus viscosity is greater than or equal to 130 kpoise.

14. A liquid crystal display substrate comprising the glass of claim 1.

15. A boroaluminosilicate glass comprising, in weight percent on an oxide basis: SiO$_2$ 58-60, Al$_2$O$_3$ 17.5-20, B$_2$O$_3$ 6.21-7.25, MgO greater than or equal to 3 and less than 5, CaO 3-4.5, SrO greater than or equal to 1.5 and less than 5, BaO 3.5-5, where SiO$_2$, Al$_2$O$_3$, B$_2$O$_3$, MgO, CaO, SrO and BaO represent the weight percent of the oxide components, wherein the glass has the following properties: (MgO+CaO+SrO+BaO)/Al$_2$O$_3$≥1.05 where Al$_2$O$_3$, MgO, CaO, SrO and BaO represent the mole percent of the oxide components, an anneal point greater than or equal to 735° C., T$_{35k}$−T$_{liq}$ is greater than or equal to 60° C., a T$_{35k}$ less than or equal to 1250° C., a CTE less than about 39×10$^{-7}$/° C., a Young's Modulus greater than or equal to 77 GPa, and a density less than or equal to 2.55 g/cm$^3$.

* * * * *